United States Patent [19]
Hirai

[11] Patent Number: 6,057,393
[45] Date of Patent: May 2, 2000

[54] SULFIDE POLYMER COMPOSITION FOR SLIDING MEMBER AND SLIDING MEMBER THEREFROM

[75] Inventor: Kazuo Hirai, Kamakura, Japan

[73] Assignee: Oiles Corporation, Tokyo, Japan

[21] Appl. No.: 08/306,437

[22] Filed: Sep. 12, 1994

Related U.S. Application Data

[63] Continuation of application No. 08/064,554, May 21, 1993, abandoned, which is a continuation-in-part of application No. 07/943,420, Sep. 14, 1992, abandoned.

[51] Int. Cl.$^7$ ..................................................... C08K 5/36
[52] U.S. Cl. ........................ 524/414; 524/417; 524/520; 524/546; 524/609; 525/189; 525/199
[58] Field of Search ...................................... 524/414, 417, 524/520, 546, 609; 525/189, 199

[56] References Cited

U.S. PATENT DOCUMENTS

| | | | |
|---|---|---|---|
| 3,487,454 | 12/1969 | Omies et al. | 525/189 |
| 4,703,076 | 10/1987 | Mori | 524/420 |
| 5,159,019 | 10/1992 | Yamamoto et al. | 525/189 |

FOREIGN PATENT DOCUMENTS

| | | |
|---|---|---|
| 50-119040 | 9/1975 | Japan . |
| 61-151267 | 7/1986 | Japan . |
| 62-86049 | 4/1987 | Japan ..................... 524/417 |
| 2-219849 | 9/1990 | Japan ..................... 524/417 |

OTHER PUBLICATIONS

The Merck Index, (1968) p. 849 Leaflet of Teflon 7A–J.
Leaflet of Daikin–Polyflon TFE Low Polymer Kogyo Zairyo, pp. 60–64 (and translation).
Inorganic Chemistry, vol. 2, pp. 713, 720, 722 and 726 Polymerization and Molecular Weight of Teflon, p. 5195–7.
J. of Applied Polymer Science, vol. 7, pp. 469–474.

*Primary Examiner*—Robert Dawson
*Attorney, Agent, or Firm*—Nixon & Vanderhye

[57] ABSTRACT

Disclosed herein is a sulfide polymer composition for a sliding member, comprising:

3–40 wt % of polyethylene tetrafluoride having a three-dimensional network structure forming-ability, 5–40 wt % of granulated polyethylene tetrafluoride having a number average molecular weight of from not less than 2,000 to less than 300,000, 0.1–15 wt % of a phosphate(s), and the balance of a sulfide polymer; and a sliding member obtained therefrom.

19 Claims, No Drawings

6,057,393

SULFIDE POLYMER COMPOSITION FOR SLIDING MEMBER AND SLIDING MEMBER THEREFROM

CROSS-REFERENCE TO A RELATED APPLICATION

This is a continuation of application Ser. No. 08/064,554, filed May 21, 1993, now abandoned, which is a continuation-in-part of application Ser. No. 07/943,420 filed Sep. 14, 1992, now abandoned.

BACKGROUND OF THE INVENTION

The present invention relates to a sulfide polymer composition which can be used for molding a sliding member such as bearings, cams, toothed wheels, slide plates, guiding parts, etc., and to the sliding member molded by using the said composition.

For its excellent heat resistance, chemical resistance and moldability, a sulfide polymer (hereinafter referred to as PPS) has been increasing the utilization in recent years for the sliding member of OA machines, etc. However, a sliding member made of PPS shows unsatisfactory self-lubricating properties, low elongation and brittleness, so that in use of PPS for sliding member, it has been usually necessary to add a solid lubricant and reinforcements in order to enhance lubricating properties and strength of the sliding member.

Some of the sliding member composed of PPS, the solid lubricant and the reinforcements are disclosed in, for instance, Japanese Patent Application Laid-Open (Kokai) Nos. 50-119040 (1975) and 2-219849 (1990).

Japanese Kokai No. 50-119040 (1975) discloses a sliding member improved in strength and endowed with lubricating properties by blending uncalcined polytetrafluoroethylene having a molecular weight of not less than $3\times10^5$ with PPS, and fibrillating and orienting the polytetrafluoroethylene in the molded product.

Japanese Kokai No. 2-219849 (1990) discloses a synthetic resin composition for a sliding member, comprising a homogeneous mixture of a synthetic resin with 5–60 wt % of polytetrafluoroethylene and 0.1–15 wt % of phosphate, and in Examples thereof, a sliding member obtained by injection molding a powdery mixture composed of polyphenylene sulfide with 30 wt % of polytetrafluoroethylene (Rublon L-5, produced by Daikin Industries, Ltd.) and phosphates (e.g., 5 wt % of magnesium phosphate, 5 wt % of barium phosphate, or 0.5 wt %, 5 wt %, 15 wt % or 20 wt % of lithium phosphate), is disclosed.

The sliding member disclosed in the prior art, particularly, the sliding member disclosed in Japanese Kokai No. 2-219849 (1990) are low in coefficient of friction at the time of restart of operation, stabilized in dynamic friction coefficient and excellent in wear resistance, but such sliding member is defective in tensile strength and elongation. There has, therefore, been strong request for offer of sliding members which are low in friction coefficient at the restart in interrupted operations, and also low and stable in dynamic friction coefficient, no increment in wear depth by rising a sliding speed, and high in tensile strength and elongation. Specifically, it has been desired to provide the sliding member which can satisfy all of the following requirements: a static friction coefficient of not more than 0.13, a dynamic friction coefficient of not more than 0.20, a maximum wear depth of not more than 15 μm, a tensile strength of not less than 500 kg/cm$^2$, and an elongation of not less than 1.3%.

As a result of the present inventor's earnest studies in order to obtain such sliding member, it has been found that by homogeneously mixing 3–40 wt % of polyethylene tetrafluoride (=polytetrafluoroethylene, hereinafter abbreviated as PTFE) having a forming-ability of a three-dimensional network structure, 5–40 wt % of granulated PTFE having a number average molecular weight of from not less than 2,000 to less than 300,000, 0.1–15 wt % of a phosphate(s) and the balance composed of PPS, and molding the resultant mixture, the obtained sliding member has a static friction coefficient of not more than 0.12, a dynamic friction coefficient of not more than 0.19, an wear depth of not more than 15 μm, a tensile strength of not less than 500 kg/cm$^2$ and an elongation of not less than 1.5%. The present invention has been attained on the basis of this finding.

SUMMARY OF THE INVENTION

In a first aspect of the present invention, there is provided a sulfide polymer composition for a sliding member, comprising: 3–40 wt % of polytetrafluoroethylene having a three-dimensional network structure forming-ability, 5–40 wt % of granulated polytetrafluoroethylene having a number average molecular weight of from not less than 2,000 0to less than 300,000, 0.1–15 wt % of a phosphate selected from the group consisting of an alkali metal or alkaline earth metal of tertiary phosphoric acid, secondary phosphoric acid, pyrophosphoric acid, phosphorous acid, metaphosphoric acid and a mixture thereof, and the balance of a sulfide polymer.

In a second aspect of the present invention, there are provided the sliding member obtained by molding the sulfide polymer composition defined in the first aspect, and having a static friction coefficient of not more than 0.12, a dynamic friction coefficient of not more than 0.19 and an wear depth of not more than 15 μm as measured in a friction and wear test conducted at sliding speed of 20 m/min under loading of 10 kg for 24 hours using SUS 304 (#800 emery finished) as a mating member, and also having a tensile strength of not less than 500 kg/cm$^2$ and an elongation of not less than 1.5%.

In a third aspect of the present invention there is provided a sulfide polymer composition according to claim 1, which comprises; 10 to 30 wt % of polytetrafluoroethylene having a three-dimensional network structure forming-ability, 5 to 25 wt % of granulated polytetrafluoroethylene having a number average molecular weight of 220,000 to 280,000, 0.5 to 10 wt % of a lithium phosphate, and the balance of a sulfide polymer.

DETAILED DESCRIPTION OF THE INVENTION

PPS used as base resin in the present invention is a thermoplastic resin having self-lubricating properties and excellent moldability.

The sulfide polymer (PPS) used in the present invention means polymers containing sulfide, which include polysulfones, polyarylsulfones, polyethersulfones and polyphenylsulfones described in Kirk Othmer, Vol. 18, p 832–848, and poly(arylene sulfide). Among them, poly (arylene sulfide), more preferably polyphenylene sulfide are preferred.

As typical examples of PPS used in the present invention, "RYTON P-4" of Phillips Corp., "W-214" of Kureha Chemical Industries Co., Ltd., and "T-4" of TOHPREN Co., Ltd. may be exemplified.

The amount of PPS used as base resin in the composition of the present invention is the balance of subtraction of the amounts of PTFE having the network structure forming-ability, granulated PTFE and phosphate(s) from the total blended amount. The amount of PPS is preferably 40–80 wt %, more preferably 50–70 wt %.

If the blending amount of PPS is too less, the composition is poor in moldability, and if it is too large, the sliding member obtained therefrom is unsatisfactory in self-lubricity, and also low in elongation and strength.

PTFE blended in PPS is composed of PTFE having a three-dimensional network structure forming-ability (fibrous dispersion forming-ability) which has principally a function as a reinforcement and granulated PTFE with number average molecular weight of from not less than 2,000 to less than 300,000 which has principally a function as a lubricant. The term "fibrous dispersion forming-ability" used here means the ability to create a state such as shown in the electron microscope photographs in Japanese Patent Application Publication (Kokoku) No. 2-60694 (1990).

"PTFE having a network structure forming-ability" of the present invention is PTFE which normally assumes a powdery state, but when mixed with other materials, forms a three-dimensional network structure. The number average molecular weight of such PTFE used in the present invention is $3 \times 10^5$ to $3 \times 10^7$, preferably $5 \times 10^6$ to $2 \times 10^7$. Such PTFE is commercially available as "molding powder" or "fine powder" for molding use. As typical examples of commercial products of such PTFE, "Teflon 6J" and "Teflon 7J" (trade names) produced by Mitsui Du Pont Fluorochemical Co., Ltd., and "Polyflon M-12" and "Polyflon F-103" (trade names) produced by Daikin Industries Co., Ltd., may be exemplified.

The amount blended of PTFE having the network structure forming-ability is 3–40 wt %, preferably 10–30 wt %. When its blending amount is less than 3 wt %, its dispersion rate in the obtained sliding member tends to be too low, making it unable to improve mechanical strength (such as tensile strength and elongation). When the said PTFE is blended in an amount exceeding 40 wt %, although it is favorable from the standpoint of improving mechanical strength of the molded product, the moldability tends to be deteriorated.

Granulated PTFE used in the present invention is PTFE of a number average molecular weight of from not less than 2,000 to less than 300,000, preferably 2,000–280,000. Such PTFE is commercially available with, for example, "Rublon L-2" and "Rublon L-5" (produced by Daikin Industries Co., Ltd.), which are used as additive. The particle size (average) of the granulated PTFE is preferably 0.1–50 μm, and its amount blended is 5–40 wt %, preferably 10–30 wt %.

When the amount of granulated PTFE blended is less than 5 wt %, there tends to deteriorate friction and wear characteristics. When its amount exceeds 40 wt %, although no deterioration of friction and wear characteristics takes place, there tends to deteriorate a fluidity and moldability, and to reduce a mechanical strength of the molded product.

As is seen from the above description, by the synergistic effect based on the co-existence of PTFE having the network structure forming-ability, granulated PTFE and phosphate (s), the technical advantages of the present invention can be obtained. A sliding member composed of PTFE having the network structure, PPS and phosphate(s) is high in both static and dynamic friction coefficients and unstable, while a sliding member composed of granulated PTFE, PPS and phosphate(s) is low in tensile strength and small in elongation, hence problematic in toughness (brashness).

It is to be noted that presence of PTFE having the network structure forming-ability is conducive to improvement of fluidity of PPS and prevention of formation of flash.

Examples of phosphates usable in the present invention include metal salts of tertiary phosphoric acid ($M_3PO_4$), secondary phosphoric acid ($M_2HPO_4$), pyrophosphoric acid ($M_2H_2P_2O_7$, $M_4P_2O_7$), phosphorous acid ($MH_2PO_3$, $M_2HPO_3$), metaphosphoric acid ($(MPO_3)_n$) and mixtures thereof. As for metals (M), alkali metals and alkaline earth metals are preferred, and among them, calcium, magnesium, barium and lithium are especially preferred.

Phosphate itself is not a substance which has lubricating properties like graphite, but the blending with the said PTFE provides further improvement of friction and wear characteristics of the product.

The reason why blending of phosphate can improve friction and wear characteristics is not yet definitely known, but the results of the experiments by the present inventor lead to the following assumption.

In continuous sliding of a sliding containing phosphate against a mating member, it has been confirmed that a solid lubricating film was formed on the surface (sliding surface) of the mating member. As the result of the analysis, this solid lubricating film was a complex film composed of PPS, PTFE and phosphate. On the other hand, in the case of a sliding member containing no phosphate, there took place no formation of a solid lubricating film on the surface of the mating member in the similar experiment. This has suggested that the phosphate contributes to formation of the solid lubricating film on the surface of the mating member.

The effect of phosphate begins to appear with addition of a small quantity, such as 0.1 wt %, and an eminent effect is provided for the friction and wear characteristics when phosphate is blended in an amount of 0.5–15 wt %.

However, in case where the amount of phosphate blended exceeds 15 wt %, the forming amount of the solid lubricating film on the surface of the mating member becomes too much, which rather causes a reduction of wear resistance.

Thus, the preferred amount of phosphate blended is in the range of 0.5–15 wt %, more preferably 0.5–10 wt %.

While the PPS composition according to the present invention is as described above, other substances such as filler which are commonly used for the purpose of improving moldability, wear resistance, loading resistance, etc.; lubricant such as molybdenum disulfide, graphite, soft metals, mineral oil, vegetable oil, synthetic lubricating oil, etc.; and reinforcements such as glass fiber, carbon fiber, aromatic polyamide fiber, aromatic polyester fiber, etc. may be added thereto.

The process for producing the sliding member according to the present invention is not specified; it is possible to apply the conventional methods and techniques. For example, a sliding member of the present invention can be obtained by homogeneously mixing 3–40 wt % of PTFE having a network structure forming-ability, 5–40 wt % of granulated PTFE having a number average molecular weight of from not less than 2,000 to less than 300,000, 0.1–15 wt % of a phosphate(s), and the balance of PPS at a temperature of 15–100° C., and molding (by injection molding, extrusion molding, compression molding, etc.) the resultant mixture at a temperature of 270–330° C. under a pressure of 10–1500 kg/cm².

The sliding member according to the present invention are characterized by the following properties: as measured in a friction and wear test (sliding test) conducted under the conditions of sliding speed: 20 m/min, loading: 10 kg, mating member: SUS 304 (#800 emery finished), no lubrication, and time: 24 hours, the static friction coefficient is not more than 0.12, preferably not more than 0.100, the dynamic friction coefficient is not more than 0.19, preferably not more than 0.170, and the wear depth is not more than 15 μm, preferably not more than 14 μm; and regarding the mechanical strength, as measured by the method of ASTM-D-638, the tensile strength is not less than 500 kg/cm², preferably not less than 575 kg/cm² and the elongation (elongation at break) is not less than 1.5, preferably 1.8–6.5%.

The sliding members of the present invention possess the above-specified properties in a well-balanced manner and are low in friction coefficient at the restart of operation, stabilized in dynamic friction coefficient, excellent in wear resistance and high in mechanical strength, so that they are useful as various sliding members such as bearings, cams, toothed wheels, slide plates, guiding parts, etc.

EXAMPLES

In the following, the present invention will be further described with reference to the examples. It is to be understood, however, that these examples are merely intended to be illustrative and not to be construed as limiting the scope of the invention.

EXAMPLES 1, 2 and 3

Powder of PPS (trade name: "T-4", produced by TOHPREN Co., Ltd.) was mixed with 10 wt % of PTFE powder having a network structure forming-ability (trade name: "Teflon 7J", produced by Mitsui Du Pont Fluoro-chemical Co., Ltd., number average molecular weight: $9 \times 10^6$–$10 \times 10^6$), 25 wt % of low-molecular weight PTFE powder (trade name: "Rublon L-5", produced by Daikin Industries, Ltd., number average molecular weight: about 250,000, average particle size: 7 μm) and 0.5 wt % (Example 1), 3 wt % (Example 2) or 10 wt % (Example 3) of lithium phosphate powder were mixed at a temperature of 25° C., and the resultant mixtures were pelletized by an extruder at molding temperature of 270–320° C. under extrusion pressure of 20 kg/cm², and the obtained pellets were charged into a screw in-line type injection molding machine by which molding was performed at molding temperature of 270–300° C. under injection molding pressure of 800 kg/cm² to obtain the cylindrical bearings having 10 mm in inner diameter, 14 mm in outer diameter and 12 mm in length.

EXAMPLE 4

PPS powder which was the same as used in Example 1, was mixed with 20 wt % of PTFE powder having a network structure forming-ability, 15 wt % of low-molecular weight PTFE powder, both being the same as used in Example 1, and 3 wt % of lithium phosphate powder, and the resultant mixture was pelletized and molded by a screw in-line type injection molding machine under the same molding conditions as in Example 1 to obtain a cylindrical bearing having 10 mm in inner diameter, 14 mm in outer diameter and 12 mm in length.

EXAMPLE 5

PPS powder which was the same as used in Example 1, was mixed with 30 wt % of PTFE powder having a network structure forming-ability, 5 wt % of low-molecular weight PTFE powder, both being same as used in Example 1, and 3 wt % of lithium phosphate powder, and the resultant mixture was pelletized and molded by a screw in-line type injection molding machine under the same molding conditions as in Example 1 to obtain a cylindrical bearing having 10 mm in inner diameter, 14 mm in outer diameter and 12 mm in length.

Comparative Example 1

PPS powder which was the same as used in Example 1, was mixed with 10 wt % of PTFE powder having a network structure forming-ability and 25 wt % of low-molecular weight PTFE powder, and the resultant mixture was pelletized and molded by a screw in-line type injection molding machine under the same molding conditions as in Example 1 to obtain a cylindrical bearing having 10 mm in inner diameter, 14 mm in outer diameter and 12 mm in length.

Comparative Example 2

PPS powder which was the same as used in Example 1, was mixed with 10 wt % of PTFE powder having a network structure forming-ability and 25 wt % of low-molecular weight PTEE powder and 20 wt % of lithium phosphate powder, and the resultant mixture was pelletized and molded by a screw in-line type injection molding machine under the same molding conditions as in Example 1 to obtain a cylindrical screw measuring having 10 mm in inner diameter, 14 mm in outer diameter and 12 mm in length.

Comparative Example 3 (Example 4 in Japanese Kokai No. 2–219849 (1990))

PPS powder which was the same as used in Example 1, was mixed with 30 wt % of PTFE "Rublon L-5" (produced by Daikin Industries, number average molecular weight: about 250,000) and 5 wt % of lithium phosphate, and the resultant mixture was pelletized and molded by a screw in-line type molding machine at molding temperature of 270–300° C. under injection molding pressure of 800 kg/cm² to obtain a cylindrical bearing having 10 mm in inner diameter, 14 mm in inner diameter and 12 mm in length.

Each of the molded products (cylindrical bearings) obtained in the Examples and Comparative Examples described above was subjected to a test on friction and wear characteristics and a test on mechanical strength (tensile strength and elongation) under the conditions shown below. The test results are shown in Table 1.

I. Friction and Wear Test Conditions
   Sliding speed: 20 m/min
   Loading: 10 kg
   Mating member: SUS 304 (#800 emery finished)
   Lubrication: No lubrication
   Time: 24 hr.
II. Measurement of Mechanical Strength
   Tensile strength:measured by the method of ASTM-D-638
   Elongation: measured by the method of ASTM-D-638

TABLE 1

|  | Coefficient of friction | | Wear depth (μm) | Tensile strength (kg/cm²) | Elongation (%) |
|---|---|---|---|---|---|
|  | Static friction coefficient | Dynamic friction coefficient |  |  |  |
| Example 1 | 0.080 | 0.160 | 10.7 | 575 | 2.7 |
| Example 2 | 0.055 | 0.135 | 5.2 | 577 | 2.5 |
| Example 3 | 0.100 | 0.170 | 14.0 | 587 | 2.0 |
| Example 4 | 0.055 | 0.145 | 6.0 | 630 | 4.0 |

TABLE 1-continued

|  | Coefficient of friction | | Wear depth (μm) | Tensile strength (kg/cm²) | Elongation (%) |
| --- | --- | --- | --- | --- | --- |
|  | Static friction coefficient | Dynamic friction coefficient |  |  |  |
| Example 5 | 0.060 | 0.150 | 7.5 | 650 | 5.0 |
| Comp. Example 1 | 0.115 | 0.190 | 32.0 | 575 | 2.8 |
| Comp. Example 2 | 0.135 | 0.220 | 55.0 | 602 | 1.3 |
| Comp. Example 3 | 0.060 | 0.150 | 6.5 | 420 | 0.6 |

In the above table, the values of dynamic friction coefficient are those determined when the steady state was reached after starting the test, and the values of static friction coefficient are those determined when the operation, once stopped after reaching the steady state of dynamic friction coefficient, was started again.

As can be seen from the test results, the PPS compositions according to the Examples of the present invention are lower and more stable in coefficient of friction and also higher in wear resistance than the compositions according to the Comparative Examples. Also, as is noted from Comparative Example 1, addition of PTFE alone to PPS can not provide good sliding properties. Products with excellent sliding properties can be obtained only when PTFE having a network structure forming-ability and low-molecular weight PTFE are blended along with a predetermined amount of phosphate(s) with PPS as in the Examples of the present invention. This appears to be due to the formation of a solid-composite lubricating film composed of PPS, PTFE and phosphate on the surface of the mating member. However, as is seen from the test results of Comparative Example 2, too much blending of phosphate adversely affects the lubricating properties of PTFE and deteriorates sliding properties of the product.

What is claimed is:

1. A sliding member having a static friction coefficient of not more than 0.12, a dynamic friction coefficient of not more than 0.19, a wear depth of not more than 15 μm, a tensile strength of not less than 500 kg/cm2 and an elongation of not less than 1.5%, said sliding member molded from a sulfide polymer composition comprising 10 to 40 wt % of polytetrafluoroethylene having a three-dimensional network structure forming-ability;

10 to 40 wt % of granulated polytetrafluoroethylene having a number average molecular weight of from not less than 2,000 to less than 300,000;

0.1 to 15 wt % of a phosphate selected from the group consisting of an alkali metal or alkaline earth metal of tertiary phosphoric acid, secondary phosphoric acid, pyrophosphoric acid, phosphorous acid, metaphosphoric acid and a mixture thereof;

and the balance of a sulfide polymer.

2. A sliding member according to claim 1, wherein the static friction coefficient is not more than 0.100, the dynamic friction coefficient is not more than 0.170, the wear depth is not more than 14.0 μm, and the tensile strength is not less than 575 kg/cm².

3. A sliding member according to claim 1, wherein the sulfide polymer is poly(arylene sulfide).

4. A sliding member according to claim 3, wherein poly(arylene sulfide) is polyphenylene sulfide.

5. A sliding member according to claim 1, wherein the content of polytetrafluoroethylene having a three-dimensional network structure forming-ability is 10 to 30 wt %, and the content of granulated polytetrafluoroethylene is 10 to 30 wt %.

6. A sliding member according to claim 1, wherein the amount of the sulfide polymer is 40 to 80 wt %.

7. A sliding member according to claim 1, wherein the number average molecular weight of polytetrafluoroethylene having a network structure forming-ability is 300,000 to 30,000,000, and the number average molecular weight of granulated polytetrafluoroethylene is 2,000 to 280,000.

8. A sliding member according to claim 1, wherein the average particle size of granulated polytetrafluoroethylene is 0.1 to 50 μm.

9. A sulfide polymer composition for a sliding member having a static friction coefficient of not more than 0.12, a dynamic friction coefficient of not more than 0.19, a wear depth of not more than 15 μm, a tensile strength of not less than 500 kg/cm² and an elongation of not less than 1.5%, comprising:

10 to 40 wt % of polytetrafluoroethylene having a three-dimensional network structure forming-ability and a number average molecular weight of 300,000 to 30,000,000, 10 to 40 wt % of granulated polytetrafluoroethylene 0.1 to 50 μm in size having a number average molecular weight of 2,000 to less than 300,000, 0.1 to 15 wt % of a phosphate selected from the group consisting of an alkali metal or alkaline earth metal of tertiary phosphoric acid, secondary phosphoric acid, pyrophosphoric acid, phosphorous acid, metaphosphoric acid and a mixture thereof, and 40 to 80 wt % of poly(arylene sulfide).

10. A composition according to claim 9, wherein the sulfide polymer is poly(arylene sulfide).

11. A composition according to claim 10, wherein poly (arylene sulfide) is polyphenylene sulfide.

12. A composition according to claim 9, wherein the content of polytetrafluoroethylene having a three-dimensional network structure forming-ability is 10 to 30 wt %, and the content of granulated polytetrafluoroethylene is 10 to 30 wt %.

13. A composition according to claim 9, wherein the amount of the sulfide polymer is 40 to 80 wt %.

14. A composition according to claim 9, wherein the number average molecular weight of polytetrafluoroethylene having a network structure firming-ability is 300,000 to 30,000,000 and the number average molecular weight of the granulated polytetrafluoroethylene is 2,000 to 280,000.

15. A composition according to claim 9, wherein the average particle size of the granulated polytetrafluoroethylene is 0.1 to 50 μm.

16. A sulfide polymer composition according to claim 9, which comprises:

10 to 30 wt % of polytetrafluoroethylene having a three-dimensional network structure forming-ability, 10 to 25 wt % of granulated polytetrafluoroethylene having a number average molecular weight of 220,000 to 280,000, 0.5 to 10 wt % of a lithium phosphate, and the balance of a sulfide polymer.

17. A sulfide polymer composition according to claim 16, the number average molecular weight of the granulated polytetrafluoroethylene is about 250,000.

18. A sliding member obtained by molding the sulfide polymer composition defined in claim 16.

19. A sulfide polymer composition for a sliding member having a static friction coefficient of not more than 0.12, a dynamic friction coefficient of not more than 0.19, a wear depth of not more than 15 μm, a tensile strength of not less than 500 kg/cm² and an elongation of not less than 1.5%, said composition comprising:

10 to 40 wt % of polytetrafluoroethylene having a three-dimensional network structure forming-ability, 10 to 40 wt % of granulated polytetrafluoroethylene having a number average molecular weight of from not less than 2,000 to less than 300,000, 0.1 to 15 wt % of a phosphate selected from the group consisting of an alkali metal or alkaline earth metal of tertiary phosphoric acid, secondary phosphoric acid, pyrophosphoric acid, phosphorous acid, metaphosphoric acid and a mixture thereof, and the balance of a sulfide polymer.

* * * * *